(12) United States Patent
Patil et al.

(10) Patent No.: US 10,186,270 B2
(45) Date of Patent: Jan. 22, 2019

(54) ACCESSING MULTIPLE VIRTUAL PERSONAL ASSISTANTS (VPA) FROM A SINGLE DEVICE

(71) Applicant: Bose Corporation, Framingham, MA (US)

(72) Inventors: Naganagouda B. Patil, Ashland, MA (US); Andre Todman, Malden, MA (US); Bernice A. Cramer, Newton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/292,857

(22) Filed: Oct. 13, 2016

(65) Prior Publication Data

US 2018/0061420 A1    Mar. 1, 2018

Related U.S. Application Data (63) Continuation of application No. 15/253,034, filed on Aug. 31, 2016.

(51) Int. Cl.
*G10L 21/00*    (2013.01)
*G10L 15/30*    (2013.01)
(Continued)

(52) U.S. Cl.
CPC ............ *G10L 15/30* (2013.01); *G06F 3/0482* (2013.01); *G10L 15/22* (2013.01); *G10L 17/22* (2013.01); *G10L 2015/223* (2013.01)

(58) Field of Classification Search
CPC ...... G10L 15/30; G10L 15/22; G10L 15/1822; G10L 2015/223; G06F 3/0482; G06F 17/30892; G06F 17/2785
(Continued)

(56) References Cited

U.S. PATENT DOCUMENTS 9,361,878 B2    6/2016  Boukadakis
9,386,154 B2    7/2016  Baciu et al.
(Continued)

OTHER PUBLICATIONS

"S Voice or Google Now?"; https://web.archive.org/web/20160807040123/lowdown.carphonewarehouse.com/news/s-voice-or-google-now/29958, Apr. 28, 2015; 4 pages.
(Continued)

*Primary Examiner* — Jakieda Jackson
(74) *Attorney, Agent, or Firm* — Fish & Richardson P.C.

(57) ABSTRACT

The technology described in this document can be embodied in a computer-implemented method that includes presenting a first user-interface that includes a user-selectable menu of multiple virtual personal assistant (VPA) service providers, and receiving a user-selection identifying a particular VPA service provider. The method also includes receiving a first signal representing input speech data, and processing the first signal to generate a first electronic file that includes at least a portion of the input speech data, the first electronic file being generated in accordance with a specification of the particular VPA service provider. The method further includes transmitting the first electronic file to one or more remote computing devices associated with the particular VPA service provider, receiving at least a second electronic file including a response to the input speech data, and causing an acoustic transducer to generate an acoustic output based on the second electronic file.

24 Claims, 5 Drawing Sheets

(51) Int. Cl.
*G06F 3/0482* (2013.01)
*G10L 17/22* (2013.01)
*G10L 15/22* (2006.01)

(58) Field of Classification Search
USPC .................................................. 704/270
See application file for complete search history.

(56) References Cited

U.S. PATENT DOCUMENTS

| | | |
|---|---|---|
| 2009/0248397 A1 | 10/2009 | Garcia et al. |
| 2013/0124211 A1* | 5/2013 | McDonough ............ H04L 51/38 704/275 |
| 2014/0164400 A1* | 6/2014 | Kruglick ............ G06F 17/30887 707/749 |
| 2014/0244712 A1* | 8/2014 | Walters ................. H04L 67/10 709/202 |
| 2014/0259075 A1* | 9/2014 | Chang ................ H04N 21/4828 725/53 |
| 2014/0310002 A1* | 10/2014 | Nitz ....................... G06Q 30/06 704/270.1 |
| 2014/0357248 A1* | 12/2014 | Tonshal .............. H04M 1/6091 455/418 |
| 2014/0365227 A1 | 12/2014 | Cash et al. |
| 2015/0019201 A1* | 1/2015 | Schoenbach .......... G06F 17/289 704/8 |
| 2015/0277846 A1* | 10/2015 | Yen .......................... G06F 3/16 715/847 |
| 2015/0348551 A1* | 12/2015 | Gruber ................ G06F 17/2705 704/235 |
| 2015/0371664 A1* | 12/2015 | Bar-or ..................... G10L 25/48 704/270.1 |
| 2016/0098992 A1 | 4/2016 | Renard et al. |
| 2016/0155442 A1* | 6/2016 | Kannan ................... G06F 3/167 704/275 |
| 2016/0162469 A1 | 6/2016 | Santos |
| 2016/0173578 A1* | 6/2016 | Sharma ............... H04L 67/1002 709/203 |
| 2016/0196499 A1* | 7/2016 | Khan ...................... G06N 5/048 706/52 |
| 2016/0203331 A1* | 7/2016 | Khan .................. G06F 21/6245 726/1 |
| 2016/0373909 A1* | 12/2016 | Rasmussen ............. H04W 4/22 |
| 2017/0103754 A1* | 4/2017 | Higbie ................... G10L 15/22 |
| 2017/0110124 A1* | 4/2017 | Boesen ............... G06F 3/04883 |
| 2017/0139720 A1* | 5/2017 | Stein ...................... G06F 9/4411 |
| 2017/0236515 A1* | 8/2017 | Pinsky ................... G10L 15/22 704/275 |

OTHER PUBLICATIONS

Fadilpasic; "Cortana can now be the default PDA on your Android"; IT Pro Portal; https://www.itproportal.com/2015/08/11/cortana-can-now-be-the-default-pda-on-your-android ; Aug. 11, 2015; 5 pages.
International Search Report and Written Opinion; PCT/US2017/049518; dated Dec. 11, 2017; 14 pages.

* cited by examiner

ACCESSING MULTIPLE VIRTUAL PERSONAL ASSISTANTS (VPA) FROM A SINGLE DEVICE

CROSS REFERENCE TO RELATED APPLICATIONS

This application is a continuation of and claims priority to U.S. application Ser. No. 15/253,034, filed on Aug. 31, 2016, the entire content of which is incorporated herein by reference.

TECHNICAL FIELD

This disclosure generally relates to technology for providing voice-activated services and controls through an acoustic device such as a headphone.

BACKGROUND

Various virtual personal assistants (VPAs) (also referred to as intelligent personal assistants (IPAs)) are available on mobile devices and computing devices for providing voice-activated services and controls. Examples of VPAs include), Alexa® (provided by Amazon Inc. of Seattle, Wash.), Google Assistant® (provided by Google Inc. of Mountain View, Calif.), S Voice® (provided by Samsung Electronics of Suwon, South Korea), Voice Mate® (provided by LG Electronics of Seoul, South Korea) and Cortana® (provided by Microsoft Inc. of Redmond, Wash.).

SUMMARY

In one aspect, this document features a computer-implemented method that includes presenting, on a first device, a first user-interface that includes a user-selectable menu of multiple virtual personal assistant (VPA) service providers, and receiving a user-selection identifying a particular VPA service provider. The method also includes receiving, at the first device, a first signal representing input speech data, and processing, using one or more processors of the first device, the first signal to generate a first electronic file that includes at least a portion of the input speech data, the first electronic file being generated in accordance with a specification of the particular VPA service provider. The method further includes transmitting the first electronic file to one or more remote computing devices associated with the particular VPA service provider, receiving at least a second electronic file including a response to the input speech data included in the first electronic file, and causing an acoustic transducer to generate an acoustic output based on the second electronic file.

In another aspect, the document also features a system that includes a display device and a controller that includes one or more processing device. The controller is configured to present on the display device, a first user-interface that includes a user-selectable menu of multiple virtual personal assistant (VPA) service providers, and receive a user-selection identifying a particular VPA service provider. The controller is also configured to receive a first signal representing input speech data, and process the first signal to generate a first electronic file that includes at least a portion of the input speech data. The first electronic file is generated in accordance with a specification of the particular VPA service provider. The controller is also configured to transmit the first electronic file to one or more remote computing devices associated with the particular VPA service provider, receive at least a second electronic file including a response to the input speech data included in the first electronic file, and cause an acoustic transducer to generate an acoustic output based on the second electronic file.

In another aspect, this document features one or more machine-readable storage devices having encoded thereon computer readable instructions for causing one or more processors to perform various operations. The operations include presenting a first user-interface that includes a user-selectable menu of multiple virtual personal assistant (VPA) service providers, and receiving a user-selection identifying a particular VPA service provider. The operations also include receiving a first signal representing input speech data, and processing the first signal to generate a first electronic file that includes at least a portion of the input speech data. The first electronic file is generated in accordance with a specification of the particular VPA service provider. The operations further include transmitting the first electronic file to one or more remote computing devices associated with the particular VPA service provider, receiving at least a second electronic file including a response to the input speech data included in the first electronic file, and causing an acoustic transducer to generate an acoustic output based on the second electronic file.

In another aspect, the document features a computer-implemented method that includes receiving a first signal representing input speech data, processing, using one or more processing devices, the first signal to detect one or more words in the input speech data, and selecting, based on the one or more words detected in the input speech data, a particular virtual personal assistant (VPA) service provider from a list of multiple voice-activated virtual personal assistant (VPA) service providers. The method also includes generating a first electronic file that includes at least a portion of the input speech data, the first electronic file being generated in accordance with a specification of the particular VPA service provider, and transmitting the electronic file to one or more remote computing devices associated with the particular VPA service provider.

In another aspect, this document features a system that includes memory and a controller that includes one or more processing devices. The controller is configured to receive a first signal representing input speech data, process the first signal to detect one or more words in the input speech data, and select, based on the one or more words detected in the input speech data, a particular virtual personal assistant (VPA) service provider from a list of multiple voice-activated virtual personal assistant (VPA) service providers. The controller is also configured to generate a first electronic file that includes at least a portion of the input speech data, the first electronic file being generated in accordance with a specification of the particular VPA service provider, and transmit the electronic file to one or more remote computing devices associated with the particular VPA service provider.

In another aspect, this document features one or more machine-readable storage devices having encoded thereon computer readable instructions for causing one or more processors to perform various operations. The operations include receiving a first signal representing input speech data, processing the first signal to detect one or more words in the input speech data, and selecting, based on the one or more words detected in the input speech data, a particular virtual personal assistant (VPA) service provider from a list of multiple voice-activated virtual personal assistant (VPA) service providers. The operations also include generating a first electronic file that includes at least a portion of the input speech data, the first electronic file being generated in accordance with a specification of the particular VPA service provider, and transmitting the electronic file to one or more remote computing devices associated with the particular VPA service provider.

Implementations of the above aspects can include one or more of the following features.

The one or more remote computing devices can provide cloud-based services for the particular VPA service provider. The user-interface can be presented on a display of the first device. In response to receiving the user-selection identifying the particular VPA service provider, a second user-interface can be presented, the second interface configured for receiving credentials for using the particular VPA service provider. The credentials can be provided to the particular VPA service provider, and a communication channel can be established with the one or more remote computing devices in response to the credentials being authenticated. The first signal representing input speech data can be captured using a microphone of an acoustic device or a remote controller connected to the first device. The acoustic device can be one of: a headset, an earphone, a portable speaker, and a hearing aid. The remote controller can control one of: an acoustic device, a media streaming device, a home theater system, or a television. The first device can be a mobile device, and the input speech data can be captured using a microphone of the mobile device. Processing the first signal can include determining that a request included in the input speech data is addressable at the first device, and processing the request by the one or more processors of the first device. The request may be excluded from the input speech data included in the first electronic file. The request can include a query.

At least a second electronic file can be received in response to transmitting the first electronic file, the second electronic file including a response to the input speech data included in the first electronic file. An acoustic transducer can be caused to generate an acoustic output based on the second electronic file. Selecting the particular VPA service provider can include detecting that the one or more words include a set of one or more keywords associated with the particular VPA service provider, and selecting the particular VPA service provider responsive to detecting that the one or more words include the set of one or more keywords. Selecting the particular VPA service provider can include determining that the one or more words do not include a set of one or more keywords associated with any one of the VPA service providers in the list, and selecting a default VPA service provider as the particular VPA service provider in response. The one or more remote computing devices can provide cloud-based services for the particular VPA service provider. The input speech data can be captured using a microphone of an acoustic device or a remote controller connected to the first device. The first input speech data can be captured using a microphone of a mobile device. The set of one or more keywords associated with the particular VPA service provider can be user-defined or user-customized.

Various implementations described herein may provide one or more of the following advantages. Multiple VPAs can be made available through a single device, thereby allowing a user to choose preferred VPAs for different tasks. For example, a user can may select a first VPA for asking for directions, a second, different VPA for shopping online, and yet another third VPA for managing appointments. Speech input received at a device can be processed to determine whether a request included in the speech input can be addressed locally at the device, and addressed accordingly. This may result in the request being processed faster than when the request is sent from the device to a remote VPA service provider. A speech input may be automatically routed to an appropriate VPA service provider based on, for example, detection of one or more keywords within the speech input. In some cases, the speech input may also be routed to an appropriate VPA service provider based on content of the speech input. For example, if a user is asking for directions, the corresponding speech input may be routed to the provider of the user's preferred VPA for asking for directions. As such, the technology described in this document allows a user to take advantage of multiple VPAs from a single device, which may, in some cases, improve the user-experience associated with spoken interactions with a device.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Virtual personal assistants (VPAs) (which may also be referred to as intelligent personal assistants (IPAs) or knowledge navigators) are increasingly being used in mobile devices and other computing devices, for example, to facilitate hands-free interaction with the devices. A VPA can be implemented as an agent application that executes on a particular device (e.g., a computing device or mobile device), and communicates with one or more remote computing devices (e.g., servers) associated with a corresponding VPA service provider to carry out tasks and provide responses and services based on a user input. For example, the agent application can provide at least a portion of the user input (e.g., speech input) to one or more computing devices (e.g., servers) associated with a remote, cloud-based VPA service provider, which then processes the portion of the user input to generate a response. The response is transmitted back to the particular device, which then executes one or more tasks (e.g., generate a display and/or play an audio file) based on the response. The VPA service provider may use information from various other sources (e.g., location information of the particular device, information on weather, news, stock prices etc. as available, for example, from various databases, user information and schedules as available, for example, from a user account, etc.) in generating the response.

VPA service providers typically provide VPA services to corresponding specific devices or applications. For example, various mobile devices have dedicated VPA applications executing on the devices. In some cases, a VPA service provider may provide an application programming interface (API) that may be used to integrate a corresponding VPA into a device. Either way, only one VPA may be available from a particular device. However, with the availability of various VPAs from multiple VPA service providers, a user may be interested in leveraging a choice of VPAs. For example, a user may want to ask for driving directions using a first VPA (e.g., Siri® provided by Apple Inc. of Cupertino, Calif.), but prefer a second VPA (e.g., Alexa® provided by Amazon Inc. of Seattle, Wash.) for ordering goods online. The technology described in this document allows for a selecting one of multiple available VPAs (or VPA service providers) from a single device. The selection may be made, for example, based on the presence of one or more keywords in the user-input, via pre-configured user settings, or automatically, e.g., based on the content of the user-input. In some implementations, the selection may be made from personal acoustic devices such as headphones or earphones connected to a source device (e.g., a mobile device, media player, or streaming device), which in turn may allow users to access their favorite VPA services through the personal acoustic devices without having to invest in devices associated with the corresponding VPA services. In some implementations, the technology described herein may also allow users to seamlessly switch between VPA choices based on, for example, preferences associated with different queries and requests. In implementations where the personal acoustic device has one or more built-in communications modules to communicate directly to cloud-based VPA service providers, the source device may not be needed.

Figure 1:
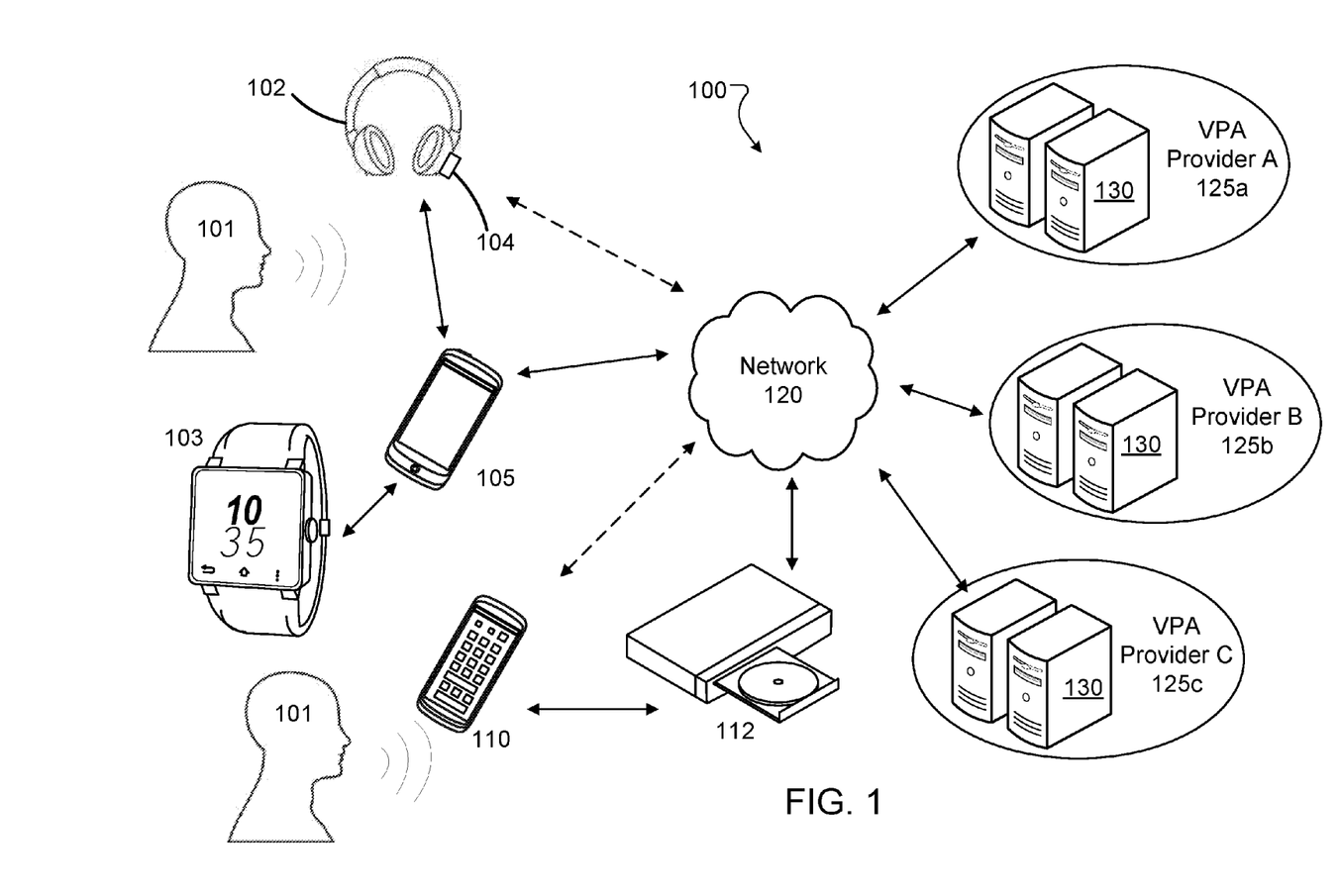
FIG. 1 is a block diagram of an example environment in which one or more devices can interact with multiple cloud-based VPA service providers.

FIG. 1 is a block diagram of an example environment 100 in which one or more devices can interact with multiple cloud-based VPA service providers. In the example environment 100, a headphone 102 is connected to a mobile device 105, for example, via a wireless connection such as a Bluetooth® connection or WiFi® connection. Also, unless specified otherwise, the term headphone, as used in this document, includes various types of personal acoustic devices such as over-the-ear and in-ear headsets, earphones, earbuds, hearing aids, or other wireless-enabled acoustic devices. Other devices such as a smart watch 103, portable speakers, docking speakers, home theater systems, radios, stereo speakers, or fitness trackers can also be used to communicate with multiple VPA service providers 125. In some implementations, a device that may communicate with multiple cloud-based VPA service providers 125 can also include a remote controller 110 configured to control a media playing device 112. The media playing device 112 can include, for example, a media streaming device, an optical disk player, a home theater receiver, or a speaker device that may be connected to a TV. The technology is described herein primarily using an example of a headphone 102 connected to a mobile device 105. However, the description is also applicable to other devices such as the remote controller 110, media playing device 112, smart watch 103, or other devices such as portable speakers, docking speakers, home theater systems, radios, stereo speakers, or fitness trackers. For example, the remote controller 110 or smart watch 103 can include a microphone configured to receive input speech data and communicate the same to the one or more VPA service providers 125 either directly over a network 120 or via an intervening device such as the media playing device 112 or the mobile device 105, respectively.

The headphones 102 and/or mobile device 105 can be configured to communicate with one or more computing devices (e.g., servers 130) associated with each of multiple VPA service providers 125a, 125b, and 125c (125, in general). For example, at least a portion of input speech data (based, for example, on the speech of a user 101) received by the device 102, 105, 110 and/or 112 may be provided over a network 120 to one or more of the VPA service providers 125, which then processes the received portion of the input speech data to generate a response. The portion of the input speech may be packaged into one or more electronic files in accordance with a specification of the particular destination VPA service provider 125. Information representing the response is then transmitted back over the network 120 to the mobile device 105 and/or the personal acoustic device 102. The information is then processed at the recipient device to generate an output (e.g., an audio clip, or a video display) for the user 101. In some implementations, input speech data can be captured by a microphone at a first acoustic device (e.g., smart watch 103) and the output can be routed to a second acoustic device (e.g., headphone 102).

In some implementations, the input speech data can be captured via a microphone 104 of the headphone 102. In some implementations, the microphone 104 could be supported by a housing of the headphone (and could be, for example, a feedback or feed-forward microphone associated with active noise reducing circuitry in the headphone). The input speech data may also be captured by a microphone of another device such as the mobile device 105 or a smart watch 103. In some implementations, the headphone 102 can include a VPA access button that may be activated to trigger the microphone 104 to capture speech input data intended for a VPA service provider 125. In some implementations, the microphone 104 can be configured to be always listening for one or more keywords indicative of a preferred VPA service provider. For example, if the keywords associated with VPA service provider A 125a are "Hello There," and are detected by the microphone 104, words or phrases following the detected keywords are captured as input speech data intended for the VPA service provider A 125a. Similarly, if the keywords associated with VPA service provider B 125b are "Tell Me," and are detected by the microphone 104, words or phrases following the detected keywords are captured as input speech data intended for the VPA service provider A 125b. In some implementations, these keywords are dictated by the VPA service providers.

In some implementations, the user can customize keywords and/or phrases to be associated with a particular VPA service provider. For example, if a user is interested in using VPA service provider A for directions, the user could configure personal acoustic device 102 to recognize a customized keyword and/or phase (e.g., "Give me directions" or "Directions") that would indicate that the input speech data is intended for the VPA service provider A. Similarly, if a user is interested in using VPA service provider B for shopping online, the user could configure personal acoustic device 102 to recognize a customized keyword and/or phrase (e.g., "I'd like to shop" or "Shopping") that would indicate that the input speech data is intended for the VPA service provider B. The user could configure these customized keywords and/or phrases via a voice and/or visual user interface (for example the interface shown in FIGS. 3A-3C as described below). The input speech data can then be provided to the connected mobile device 105 for processing and subsequent packaging for transmission to a destination VPA service provider 125. This may be done, for example, using an application program executing on the mobile device 105 and/or the personal acoustic device. In some implementations, once the microphone 104 is triggered to capture the input speech data, the headphone 102 may establish a connection (e.g., a wireless connection) with the mobile device 105 and start streaming the data captured by the microphone to the application program executing on the mobile device 105. In some implementations, the application may already be executing on the mobile device when the microphone 104 is triggered. In some cases, where the application is not already executing, triggering of the microphone 104 can cause the application to be launched. In some implementations, launching of the application upon triggering of the microphone 104 may require a user-input (e.g., via the mobile device 105) indicative of a permission to launch the application.

The application program can be configured to record the incoming data from the microphone 104 substantially continuously until, for example, a gap in speech (which may signify an end of the spoken input) is detected. The application can then be configured to package at least a portion of the recorded audio into one or more electronic files in accordance with specifications of the destination VPA service provider as selected or indicated by the user. For example, the specified file format for VPA service provider A 125a may be .wav, whereas the specified file formats for VPA service providers 125b and 125c are .mpg and .txt, respectively. In this example, the application can be configured to package portions of the input speech into .wav or .mpg files depending on whether the destination VPA service provider is 125a or 125b, respectively. If the destination VPA service provider is 125c, the application can also be configured to perform speech recognition and include portions of the recognized speech within a .txt file, as per specifications for VPA service provider C 125c.

In some implementations, the headphone 102 may directly communicate at least a portion of the speech input to a destination VPA service provider 125. For example, if the headphone 102 is wireless-enabled (e.g., a Wi-Fi® enabled device having an IP address), the headphone 102 may directly transmit a portion of the speech input to a destination VPA service provider 125 over the network 120. Similarly, if a remote controller 110 is wireless-enabled, the remote controller 110 may directly communicate with a VPA service provider 125 (e.g., bypassing the corresponding media playing device 112) over the network 120. In such cases, one or more processing devices (e.g., microprocessors, microcontrollers, or digital signal processors) on the headphone 102 (or the remote controller 110) can be configured to execute an application program that processes the input speech data in accordance with specifications of the destination VPA service provider 125.

Figure 2:
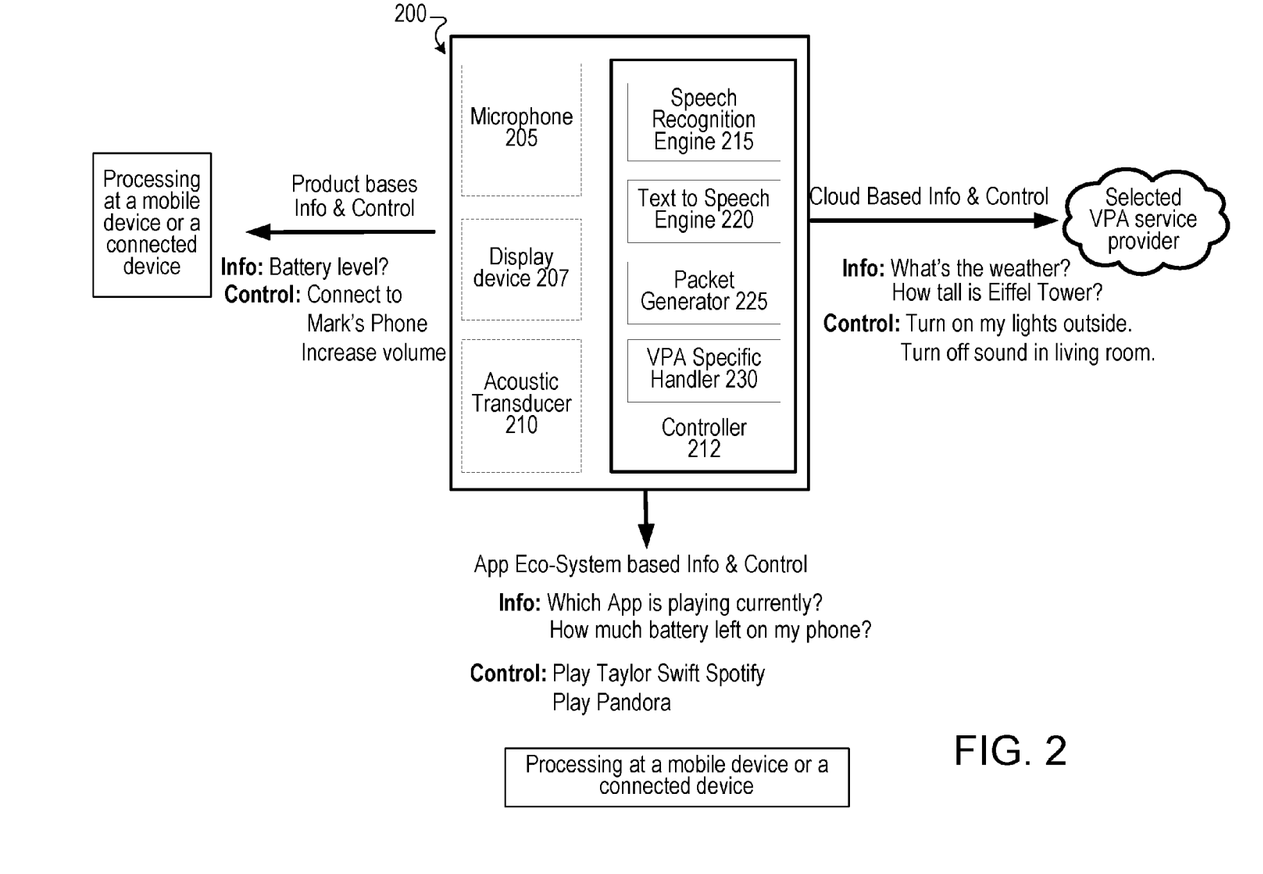
FIG. 2 shows an example block-diagram of a device configured to interact with multiple VPA service providers.

FIG. 2 shows an example block-diagram of a device 200 configured to interact with multiple VPA service providers. Examples of the device 200 can include a headphone 102, a smart watch 103, a mobile device 105, or a remote controller 110. In some implementations, the device 200 includes one or more microphones 205 for capturing input speech and one or more acoustic transducers (e.g., speakers) for generating an acoustic output based on, for example, a response to the input speech data. In some implementations, the device 200 includes a display device 207 configured to present, for example, one or more user interfaces associated with accessing one of the multiple VPA service providers. For example, the display device 207 can be configured to present a user-interface that includes a user-selectable menu of multiple VPA service providers. In some implementations, the display device 207 can also be configured to present a user-interface for receiving credentials (e.g., username-password pair) for using a particular VPA service provider. In some implementations, for example where the device 200 is tethered (e.g., via a wireless connection) to a mobile device (or another device that includes a display), the device 200 may not include the display device 207. In some implementations, for example an in-ear headphone where there is limited space for a display, the one or more acoustic transducers may be used to provide voice prompts to a user, which may act as the user interface for configuring multiple VPA service providers. In some implementations, the microphone 205 and/or acoustic transducer 210 may be disposed in a separate device. For example, if the device 200 is a mobile device, the microphone 205 and/or acoustic transducer 210 may be disposed in a separate device (e.g., a headphone) connected to the mobile device.

The input speech data captured by the microphone 205 (or received from another device) can be processed by the device 200 in various ways. In some implementations, at least a portion of the input speech data may be processed locally at the device 200 to address one or more requests or queries included within the input speech data. For example, if a portion of the input speech data requests product-based information or control pertaining to the device 200, the portion of the input speech data may be processed and/or addressed locally at the device 200 or at a connected device. In some implementations, the device 200 can be a mobile device to which an acoustic device (e.g., a headset) is connected. In such cases, input speech data received through a microphone of the headset may be parsed at the mobile device (e.g., using an application executing on the mobile device), and at least a portion of the input speech data may be addressed/processed locally at the mobile device, for example, to control and/or provide information about the acoustic device. Examples of such product based information and control include a query about the battery level of the acoustic device, and an instruction for altering a volume level or other playback control parameter of the acoustic device. In another example, a portion of the input speech data may request information and/or control pertaining to an application ecosystem. Examples of such information and control include a query on which applications are currently executing on a connected mobile device (or on the device 200 itself, for example, if the device 200 is capable of executing applications), a query on remaining battery power of the mobile device, or a request to perform a particular task on the mobile device (e.g., launch a particular application or provide particular information). In such cases, the portion of the input speech data may also be processed and/or addressed locally, for example, either at the device 200 itself, or at a mobile device connected to the device 200 (e.g., in cases where the device 200 is an acoustic device such as a headset).

In some implementations, such local processing of at least portions of input speech data may reduce an amount of data that is sent to a remote computing system (e.g., one or more computing devices associated with a cloud-based VPA service provider) and/or time required to address the corresponding portions of the request. For example, information about remaining battery life of the device 200 is available locally, and may be provided to a user without having to send the information to a VPA service provider and generate an output based on a response received from the VPA service provider. In some cases, such local processing may reduce latency in providing information to a user, thereby potentially improving the overall user experience.

In some implementations, if a portion of the input speech data may be processed and/or addressed locally, the portion may be excluded from information sent to a VPA service provider. In some implementations, even if a portion of the input speech data is addressable locally, the portion is not excluded from the information sent to a VPA service provider. In such cases, if the response generated by the VPA service provider is received before the locally generated response, the former can be used for providing a corresponding output to the user. Such redundancy may be useful, for example, in leveraging superior processing power available from the VPA service provider (or in compensating for lack of adequate processing power available locally), and ensuring that a response is provided to the user as quickly as possible.

If a portion of the input speech data requests information and/or control that is not available locally, the portion of the input speech data is used in generating one or more electronic files that are sent to a selected VPA service provider for processing. Examples of such information and/or control can include information that may be available in remote databases (e.g., weather information, "How tall is the Eiffel Tower?" or "What time does the next 30B bus arrive at South Station?"), or instructions that may require communications with computing devices of a third-party service provider (e.g., "Turn on my lights outside," or "Set the bedroom thermostat to 75 degrees at 6:30 PM."). In such cases, the device 200 processes the input speech data to generate one or more electronic files based on at least a portion of the input speech data in accordance with specifications of the selected VPA service provider.

The device 200 includes a controller 212 that processes the input speech data, for example, to determine whether at least a portion of the input speech data may be processed locally and accordingly generate the one or more electronic files to be transmitted to the selected VPA service provider. The controller 212 can include one or more processing devices (e.g., one or more microprocessors, microcontrollers, or digital signal processors) that may be used for implementing various modules of the controller 212. In some implementations, the controller can execute an application on the device 200 for implementing one or more modules. In some implementations, the controller 212 includes a speech recognition engine 215 that processes the input speech data to determine content of the input speech data. The output of the speech recognition engine can be used to determine, for example, which of the multiple VPA service providers have been selected by the user to process the requests within the input speech data. For example, the output of the speech recognition engine 215 can be analyzed to monitor for one or more keywords indicative of the user's choice of a VPA service provider. If such keywords are detected, at least portions of the input speech data are prepared for routing to the selected VPA service provider. On the other hand, if no keywords are detected, relevant portions of the input speech data may be routed to a default VPA service provider (which may also be pre-selected by the user).

The controller 212 can also include a packet generator 225 that generates data packets based on the portions of the input speech data to be transmitted to the selected VPA service provider. For example, if the controller determines that a portion of the input speech data may be addressed locally at the device 200, the packet generator 225 can be configured to omit the relevant portions from the data packets prepared for the selected VPA service provider. In some implementations, such portions may still be included in the data packets even if the portions are locally addressable at the device 200.

The controller 212 further includes a VPA specific handler 230 that formats the information to be sent to the selected VPA in accordance with the specifications of the selected VPA. For example, if a particular VPA service provider requires an input in the form of a .wav file, the VPA specific handler 230 can be configured to generate such a wave file based on, for example, a portion of the input speech data determined to be sent to the particular VPA service provider. In another example, if a selected VPA service provider requires an input in the form of .txt files, the VPA specific handler 230 may coordinate with the speech recognition engine in creating such a file for the selected VPA service provider.

The controller 212 can receive, responsive to local processing of a portion of the input speech data and/or transmitting a portion of the input speech data to a remote VPA service provider, one or more electronic files that represent a response to requests, queries etc. included within the input speech data. In some implementations, the received electronic files can be used for causing an acoustic transducer to generate an acoustic output. In some implementations, this may be facilitated by a text-to-speech (TTS) engine 220 configured to generate intelligible audio based on one or more electronic files that include the response (either locally generated, or received from a remote VPA service provider). In some implementations, the received electronic files can be used for causing an output on a display associated with the device 200 or at a mobile device connected to the device 200.

Figure 3A:
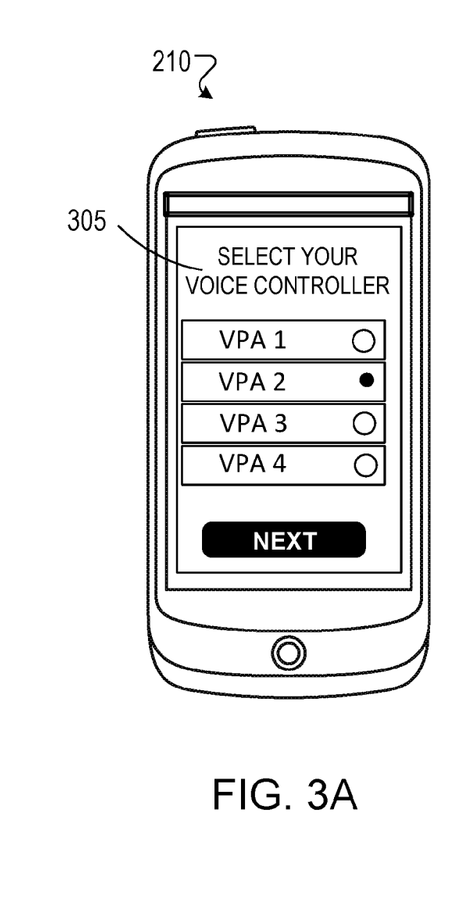
FIGS. 3A-3C are example screenshots associated with configuring an acoustic device to interact with multiple VPA service providers.
Figure 3B:
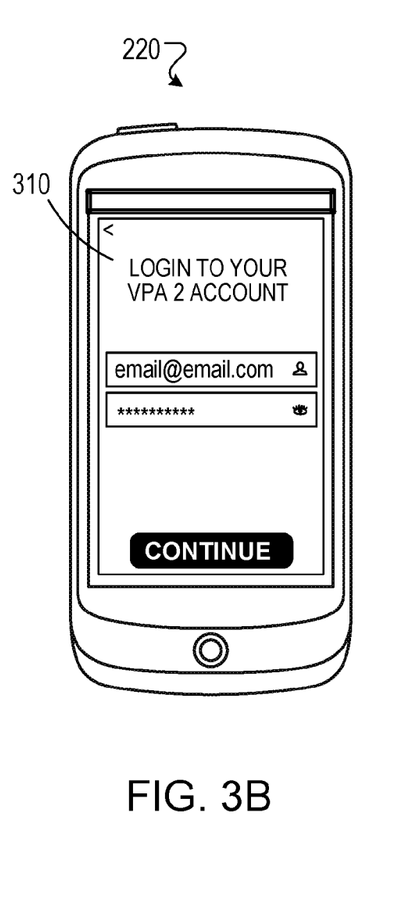
Figure 3C:
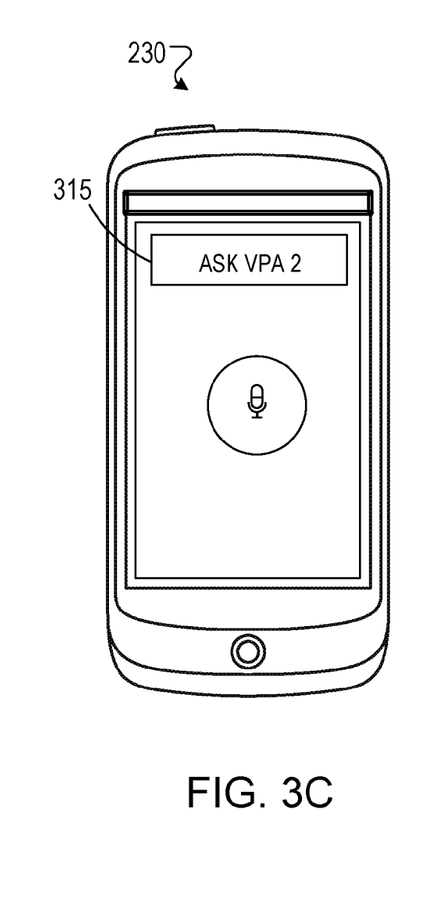

FIGS. 3A-3C are example screenshots associated with configuring an acoustic device to interact with multiple VPA service providers. The screenshots shown in these figures may be presented, for example, on a display device 207 described above with reference to FIG. 2. Specifically, FIG. 3A shows a user-interface 305 that includes a user-selectable menu of multiple VPA service providers. The user-interface 305 can be used, for example, to set a default VPA service provider (e.g., the one to use when the user does not specify a VPA service provider in a spoken input) or to specify the VPA service provider to be used for all requests and queries. In some implementations, the user-interface 305 may also be used for configuring the various VPA service providers included in the user-selectable menu.

In some implementations, responsive to receiving a user-selection of a particular VPA service provider via the user-interface 305, a second user-interface 310 (as shown in FIG. 3B) is presented on the display device for receiving credentials for using the particular VPA service provider. For example, if the user-selection indicates the selection of VPA 2 as a VPA service provider, the second user-interface 310 may display one or more text-boxes for receiving credentials (e.g., email/username and password pair) associated with an account set up for using the VPA 2. Upon receiving the credentials from a user, the credentials may be provided to the corresponding VPA service provider for authentication, and a communication channel with one or more computing devices associated with the corresponding VPA service provider is established upon authentication of the credentials. In some implementations, a third user-interface 315 (as shown in FIG. 3C) for receiving speech input is presented upon the credentials being authenticated. While the examples in FIGS. 3A-3C depict a visual user interface for configuring one or more VPA service providers, in other implementations, a user could configure and establish connections to VPA service providers via a voice user interface and/or manually operable controls on a personal device (for example, on device 200 described above with reference to FIG. 2).

Figure 4:
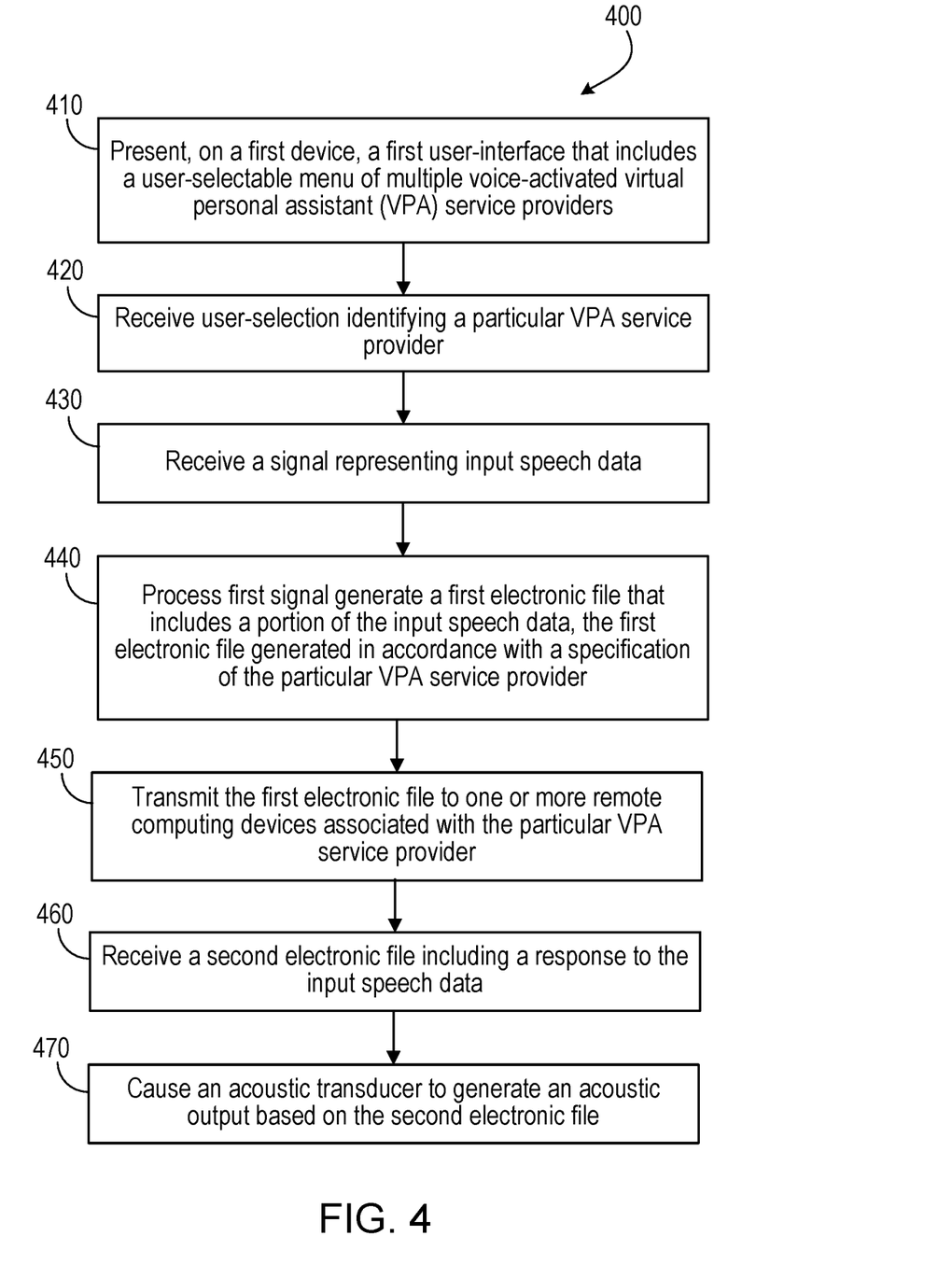
FIG. 4 is a flowchart of an example process for interacting with a user-selected VPA service provider.

FIG. 4 shows a flowchart for an example process 400 for interacting with a user-selected VPA service provider. In some implementations, at least a portion of the process 400 may be executed on a device such as the device 200 described above. For example, the process 400 may be executed, at least in part, on a mobile device, a headphone, a remote controller or a smart watch. In some implementations, execution of the process 400 may be facilitated, at least in part, by an application executing on a mobile device.

Operations of the process 400 include presenting, on a first device, a first user-interface that includes a user-selectable menu of multiple virtual personal assistant (VPA) service providers (410). The user-interface can be presented, for example, on a display device of the first device. The first device can be, for example, a mobile device, a headphone, a smart watch, or a remote controller. In some implementations, the first interface can be substantially similar to the user-interface 305 illustrated in FIG. 3A. Operations of the process 400 also include receiving a user-selection identifying a particular VPA service provider (420). The user selection can be received via a user-interface such as the user-interface 305, or as a spoken input.

Operations of the process 400 also include receiving, at the first device, a first signal representing input speech data (430). In some implementations, the first signal representing input speech data can be captured using a microphone of an acoustic device (e.g., a headphone, a headset, an earphone, a portable speaker, or a hearing aid), or a smart watch. The input speech data may also be captured using the microphone of a remote controller that controls, for example, an acoustic device, a media streaming device, a home theater system, or a television. In some implementations, the input speech data may also be captured using the microphone of a mobile device such as a smartphone, tablet computer, or e-reader, or another computing device such as a laptop or desktop computer.

Operations of the process 400 further include processing, using one or more processors of the first device, the first signal to generate a first electronic file that includes at least a portion of the input speech data, the first electronic file being generated in accordance with a specification of the particular VPA service provider (440). In some implementations, processing the first signal can include determining that a request included in the input speech data is locally addressable at the first device, and processing the request by the one or more processors of the first device. In some implementations, the locally addressable request may be excluded from the input speech data that is included in the first electronic file. The first electronic file can be generated in accordance with the specification of the particular VPA service, for example, as described above with reference to FIGS. 1 and 2.

Operations of the process 400 also include transmitting the first electronic file to one or more remote computing devices associated with the particular VPA service provider (450) and receiving a second electronic file including a response to the input speech data included in the first electronic file (460). The one or more remote computing devices can be ones that provide cloud-based services for the particular VPA service provider. The operations further include causing an acoustic transducer to generate an acoustic output based on the second electronic file (470). If the process 400 is being executed on a mobile device, and the acoustic transducer is on a headphone, this can include transmitting a representation of the received response from the mobile device to the headphone such that the acoustic transducers (e.g., speakers) in the headphone can be used for playing back an audible version of the response.

Figure 5:
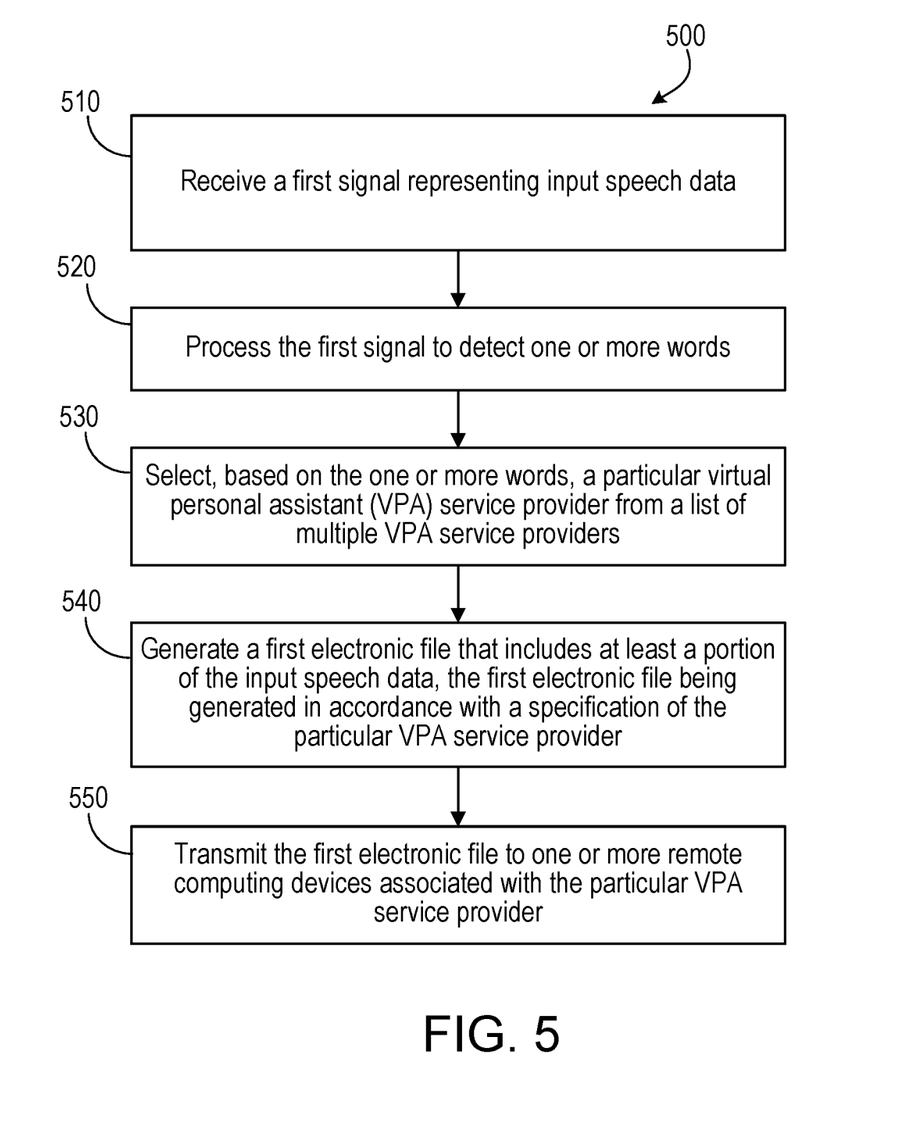
FIG. 5 is a flowchart of an example process of selecting one of multiple VPA service providers based on detecting the presence of one or more words in a speech input.

FIG. 5 shows a flowchart for an example process 500 for selecting one of multiple VPA service providers based on detecting the presence of one or more words in a speech input. In some implementations, at least a portion of the process 500 may be executed on a device such as the device 200 described above. For example, the process 500 may be executed, at least in part, on a mobile device, a headphone, a remote controller or a smart watch. In some implementations, execution of the process 500 may be facilitated, at least in part, by an application executing on a mobile device.

Operations of the process 500 include receiving a first signal representing input speech data (510). In some implementations, the first signal representing input speech data can be captured using a microphone of an acoustic device (e.g., a headphone, a headset, an earphone, a portable speaker, or a hearing aid), or a smart watch. The input speech data may also be captured using the microphone of a remote controller that controls, for example, an acoustic device, a media streaming device, a home theater system, or a television. In some implementations, the input speech data may also be captured using the microphone of a mobile device such as a smartphone, tablet computer, or e-reader, or another computing device such as a laptop or desktop computer.

Operations of the process 500 also include processing the first signal to detect one or more words in the input speech data (520). The one or more words can be keywords associated with various VPA service providers. For example, the keywords can be words that are pre-determined by a particular VPA service provider to trigger that VPA service provider or the keywords can be words that the user has customized to be associated with a particular VPA service provider. In some implementations, this may be performed, for example, using the speech recognition engine 215 of the controller 212 described above with reference to FIG. 2.

Operations of the process 500 further include selecting, based on the one or more words detected in the input speech data, a particular virtual personal assistant (VPA) service provider from a list of multiple voice-activated virtual personal assistant (VPA) service providers (530). For example, the controller 212 of a device 200 can be configured to detect that the one or more words include a set of one or more keywords associated with the particular VPA service provider, and in response, select the particular VPA service provider for addressing/routing at least a portion of the input speech data. In some implementations, if the input speech data does not include keywords associated with any of the VPA service providers, a default VPA service provider may be selected to address at least a portion of the input speech data.

Operations of the process 500 further include generating a first electronic file that includes at least a portion of the input speech data, the first electronic file being generated in accordance with a specification of the particular VPA service provider (540). In some implementations, this can include determining that a request included in the input speech data is locally addressable on the device executing the process 500, and processing the request by the one or more processors of the device. In some implementations, the locally addressable request may be excluded from the input speech data that is included in the first electronic file. The first electronic file can be generated in accordance with the specification of the particular VPA service, for example, as described above with reference to FIGS. 1 and 2.

Operations of the process 500 also include transmitting the first electronic file to one or more remote computing devices associated with the particular VPA service provider (550). The one or more remote computing devices can be ones that provide cloud-based services for the particular VPA service provider. The first electronic file may be transmitted via a communication channel established with the one or more remote computing devices. In case such a channel has not already been established, credentials for using the particular VPA service provider can be retrieved (e.g., from a storage location, or from a user via a user-interface as shown in FIG. 3B), and provided to the particular VPA service provider. The communication channel can then be established in response to the credentials being authenticated by the VPA service provider.

In response to transmitting the first electronic file to the VPA service provider, one or more electronic files may be received from the remote computing devices, such files including a response to the input speech data included in the first electronic file. An acoustic output can then be generated based, at least in part, on the second electronic file, via an acoustic transducer.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). In some implementations, at least a portion of the functions may also be executed on a floating point or fixed point digital signal processor (DSP) such as the Super Harvard Architecture Single-Chip Computer (SHARC) developed by Analog Devices Inc.

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments and applications not specifically described herein are also within the scope of the following claims. For example, the technology described herein may be used for an automated selection of VPA service provider based on content of the input speech data. For example, a machine learning process may be used to determine that a user typically uses a first VPA service provider in asking for driving directions, and a second VPA service provider for online shopping. Accordingly, when the input speech data is determined to include a shopping request, the request may automatically be routed to the second VPA even if the user has not explicitly specified the keywords for the second VPA. In some implementations, the user may specify, for example via a user-interface, different VPA service providers for different types of requests, and such preferences may be used for automatic routing of the input speech data to different VPA service providers. The machine learning process may be updated and refined based on user input in response to a particular VPA service provider being selected. For example, if the user indicates via a user interface that a different VPA service provider should have been selected for the particular request being processed, the machine learning process may take this information into account in processing future requests. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A computer-implemented method comprising:
   presenting, on a first device, a first user-interface that includes a user-selectable menu of multiple virtual personal assistant (VPA) service providers;
   receiving, via the first user-interface presented on the first device, a user-selection identifying a particular VPA service provider;
   receiving, at the first device, a first signal representing input speech data;
   determining, by one or more processors of the first device, that a first portion of the input speech data is addressable at the first device, the first portion of the input speech data representing a request;
   responsive to determining that the first portion of the input speech data is addressable at the first device, processing the first portion of the input speech data by the one or more processors of the first device;
   processing, using the one or more processors of the first device, the first signal to generate a first electronic file that includes at least a second portion of the input speech data, the first electronic file being generated in accordance with a specification of the particular VPA service provider, wherein the first portion of the input speech data is excluded from the first electronic file;
   transmitting the first electronic file to one or more remote computing devices associated with the particular VPA service provider;
   receiving at least a second electronic file including a response to the input speech data included in the first electronic file; and
   causing an acoustic transducer to generate an acoustic output based on the second electronic file.

2. The method of claim 1, wherein the one or more remote computing devices provide cloud-based services for the particular VPA service provider.

3. The method of claim 1, wherein the user-interface is presented on a display of the first device.

4. The method of claim 1, further comprising:
   in response to receiving the user-selection identifying the particular VPA service provider, presenting a second user-interface for receiving credentials for using the particular VPA service provider;
providing the credentials to the particular VPA service provider; and
establishing a communication channel with the one or more remote computing devices in response to the credentials being authenticated.

5. The method of claim 1, wherein the first signal representing input speech data is captured using a microphone of an acoustic device or a remote controller connected to the first device.

6. The method of claim 5, wherein the input speech data is captured using the microphone of the acoustic device, and the acoustic device is one of: a headset, an earphone, a portable speaker, and a hearing aid.

7. The method of claim 5, wherein the input speech data is captured using the microphone of the remote controller, wherein the remote controller controls one of: an acoustic device, a media streaming device, a home theater system, or a television.

8. The method of claim 1, wherein the first device is a mobile device, and the first signal representing input speech data is captured using a microphone of the mobile device.

9. The method of claim 1, wherein the request comprises a query.

10. A system comprising:
a display device; and
a controller comprising one or more processing devices, the controller configured to:
present on the display device, a first user-interface that includes a user-selectable menu of multiple virtual personal assistant (VPA) service providers,
receive, via the first user-interface presented on the display device, a user-selection identifying a particular VPA service provider,
receive a first signal representing input speech data,
determine that a first portion of the input speech data is addressable by the controller;
process the first portion of the input speech data responsive to determining that the first portion of the input speech data is addressable by the controller, the first portion of the input speech data representing a request;
process the first signal to generate a first electronic file that includes at least a portion of the input speech data, the first electronic file being generated in accordance with a specification of the particular VPA service provider;
transmit the first electronic file to one or more remote computing devices associated with the particular VPA service provider, wherein the first portion of the input speech data is excluded from the first electronic file;
receive at least a second electronic file including a response to the input speech data included in the first electronic file; and
cause an acoustic transducer to generate an acoustic output based on the second electronic file.

11. The system of claim 10, wherein the controller is also configured to:
in response to receiving the user-selection identifying the particular VPA service provider, present a second user-interface for receiving credentials for using the particular VPA service provider;
provide the credentials to the particular VPA service provider; and
establish a communication channel with the one or more remote computing devices in response to the credentials being authenticated.

12. The system of claim 10, wherein the first signal representing input speech data is captured using a microphone of an acoustic device or a remote controller.

13. The system of claim 12, wherein the input speech data is captured using the microphone of the acoustic device, and the acoustic device is one of: a headset, an earphone, a portable speaker, and a hearing aid.

14. The system of claim 12, wherein the input speech data is captured using the microphone of the remote controller, and wherein the remote controller controls one of:
an acoustic device, a media streaming device, a home theater system, or a television.

15. The system of claim 10, wherein the input speech data is captured using a microphone of a mobile device.

16. The system of claim 10, wherein the request comprises a query.

17. One or more machine-readable storage devices having encoded thereon computer readable instructions for causing one or more processing devices to perform operations comprising:
presenting, on a first device, a first user-interface that includes a user-selectable menu of multiple virtual personal assistant (VPA) service providers;
receiving, via the first user-interface presented on the first device, a user-selection identifying a particular VPA service provider;
receiving, at the first device, a first signal representing input speech data;
determining that a first portion of the input speech data is addressable at the first device, the first portion of the input speech data representing a request;
responsive to determining that the first portion of the input speech data is addressable at the first device, processing the first portion of the input speech data at the first device;
processing the first signal to generate a first electronic file that includes at least a second portion of the input speech data, the first electronic file being generated in accordance with a specification of the particular VPA service provider, wherein the first portion of the input speech data is excluded from the first electronic file;
transmitting the first electronic file to one or more remote computing devices associated with the particular VPA service provider;
receiving at least a second electronic file including a response to the input speech data included in the first electronic file; and
causing an acoustic transducer to generate an acoustic output based on the second electronic file.

18. The one or more machine-readable storage devices of claim 17, wherein the one or more remote computing devices provide cloud-based services for the particular VPA service provider.

19. The one or more machine-readable storage devices of claim 17, wherein the user-interface is presented on a display of the first device.

20. The one or more machine-readable storage devices of claim 17, further comprising instructions for:
in response to receiving the user-selection identifying the particular VPA service provider, presenting a second user-interface for receiving credentials for using the particular VPA service provider;
providing the credentials to the particular VPA service provider; and establishing a communication channel with the one or more remote computing devices in response to the credentials being authenticated.

21. The one or more machine-readable storage devices of claim 17, wherein the first signal representing input speech data is captured using a microphone of an acoustic device or a remote controller connected to the first device.

22. The one or more machine-readable storage devices of claim 21, wherein the input speech data is captured using the microphone of the acoustic device, and the acoustic device is one of: a headset, an earphone, a portable speaker, and a hearing aid.

23. The one or more machine-readable storage devices of claim 21, wherein the input speech data is captured using the microphone of the remote controller, wherein the remote controller controls one of: an acoustic device, a media streaming device, a home theater system, or a television.

24. The one or more machine-readable storage devices of claim 17, wherein the first device is a mobile device, and the first signal representing input speech data is captured using a microphone of the mobile device.

* * * * *